A. J. BRUNSON.
FRUIT CUTTER.
APPLICATION FILED AUG. 3, 1908.
909,145.
Patented Jan. 12, 1909.
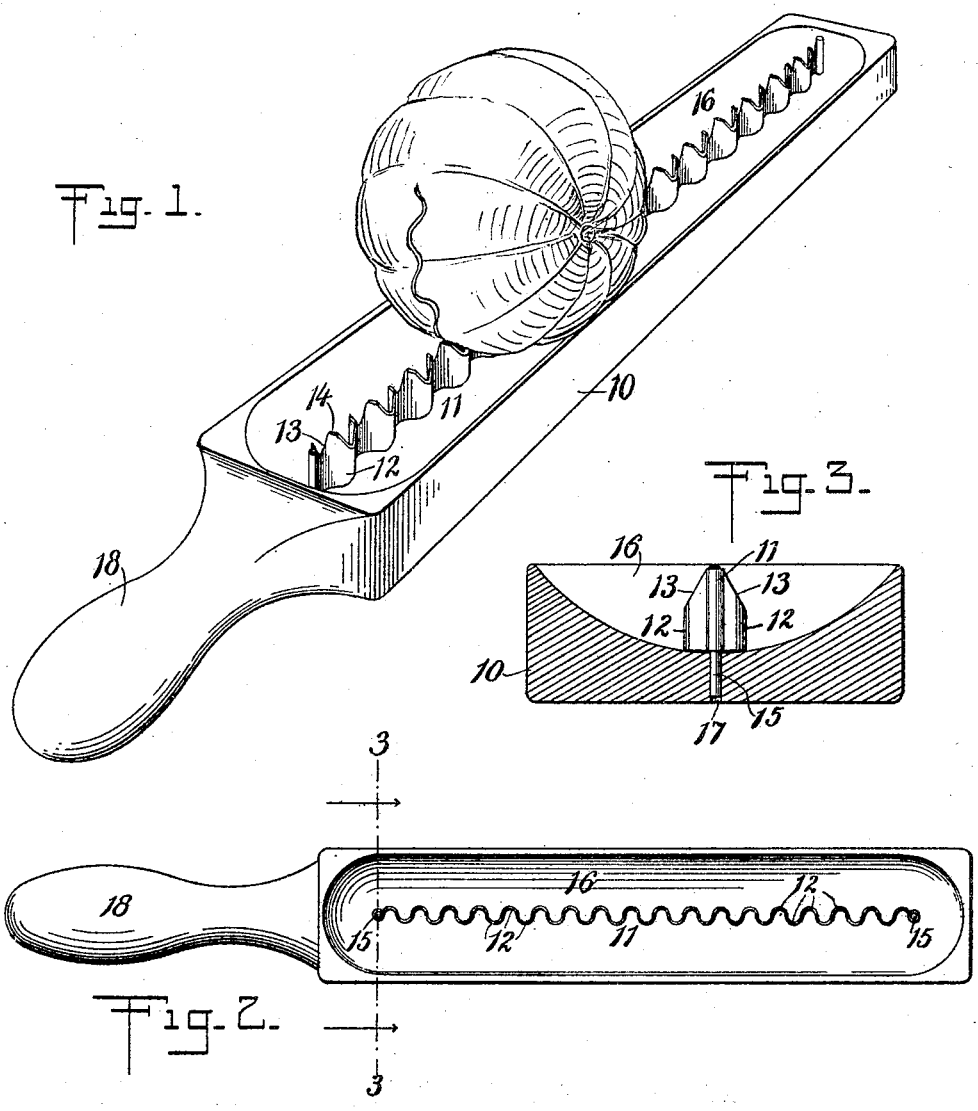
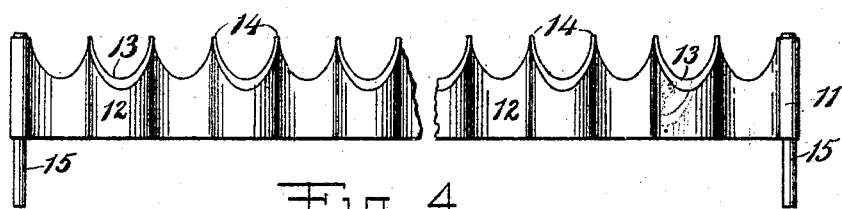
WITNESSES
INVENTOR

UNITED STATES PATENT OFFICE.

AUGUSTUS J. BRUNSON, OF NORTH PLAINFIELD, NEW JERSEY.

FRUIT-CUTTER.

No. 909,145.     Specification of Letters Patent.     Patented Jan. 12, 1909.

Application filed August 3, 1908. Serial No. 446,569.

*To all whom it may concern:*

Be it known that I, AUGUSTUS J. BRUNSON, a citizen of the United States, residing in the borough of North Plainfield, in the county of Somerset and State of New Jersey, have invented a new and useful Fruit-Cutter, of which the following is a full, clear, and exact description.

My invention has for an object, to provide a simple device for readily and conveniently cutting open, oranges, grape fruit, melons and other fruit as well.

Further objects of the invention are to provide a blade adapted to make a cut of sinuous or patterned form, to provide a detachable mounting for said blade, so that it may readily be removed when it is necessary to cleanse the blade, and to provide means for catching the juices that issue from the fruit during the cutting operation.

With these objects in view, my invention consists in the novel arrangements and combinations of parts as will be hereinafter fully described and claimed.

Reference is to be had to the accompanying drawing forming part of this specification in which similar characters of reference indicate corresponding parts in all the figures.

Figure 1 is a perspective view of my improved fruit cutter, showing it in the act of cutting a melon; Fig. 2 is a plan view of the fruit cutter; Fig. 3 is a sectional view taken on the line 3—3 of Fig. 2 and viewed in the direction of the arrows, and Fig. 4 is a side elevation of a cutting blade used in the fruit cutter.

As shown in the drawing, my fruit cutter comprises a back piece or base 10 and a cutting blade 11, secured lengthwise to said base.

The blade 11 consists of a strip of metal formed with corrugations 12 extending transversely across said blade, and disposed alternately on opposite sides of the blade substantially as indicated in the plan view Fig. 2. At the upper or cutting edge of the blade, each corrugation 12 is notched or partly cut away at an angle to the general plane of the blade forming an inclined concave or scalloped edge 13 which is preferably ground or sharpened. These scalloped edges 13 of successive corrugations are inclined inward and are connected by piercing edges 14. The latter need not necessarily be sharpened, as their purpose is to puncture or pierce the rind of the fruit, while the scalloped edges cut the rind. At each end the blade 11 is wrapped around a pin 15 and soldered or otherwise secured thereto. The pins 15 project below the lower edge of the blade.

In the upper face of the base, 10 a concavity or channel 16 is formed. Near each end of the channel is a socket or hole 17 and these holes are adapted to receive the projecting ends of the pins 15 as indicated in Fig. 3.

The space between the holes 17 is preferably greater than the normal distance between the pins 15 so that the blade must be extended lengthwise to permit of introducing the pins 15 into the holes. The blade is made of material that is sufficiently resilient to permit of the necessary extension and after the pins have been seated in the holes, the spring tension of the blade will serve to bind the pins in the holes and prevent the blade from dropping off the base.

The base 10 is formed at one end with a handle 18 of convenient form with which the fruit cutter may be operated, or steadied according to the manner of using the device.

Fig. 1 illustrates the preferred method of using my fruit cutter. The device is placed on a table or suitable support, with the cutting side up. The fruit is then pressed onto the blade 11, causing the edges 14 to pierce the rind, after which the fruit is cut open by rolling it along the edge of the blade. Owing to the corrugated form of the blade, the fruit rind will be cut with a sinuous or scalloped edge, giving it a novel and pleasing effect.

I do not limit myself to the precise form of blade, shown in the drawings. Different curved angular or patterned edges may be cut by varying the form of the corrugations 12 and all such various forms are included within the scope of this invention.

During the cutting operation, the juices that ooze out of the fruit, will collect in the channel 16. This channel is made sufficiently broad to permit the fruit to come into proper engagement with the blade 11. The channel is preferably of arcuate form in cross section and serves as a guide for the fruit, to assist in rolling it along a straight line. The depth of the channel is made greater than the height of the blade so that the latter will not project above the sides of the channel and interfere with the stacking of a number of fruit cutters one above the other.

While in use, it is preferable to roll the fruit on the cutter, the cutter may also be pressed face downward on the fruit, and moved in such manner as to roll the fruit along the table, or other support, on which it rests, and thus cut it open.

Whenever desired, the blade may be detached, from the base, by a slight pull and cleansed, after which it may readily be sprung into engagement with the base again.

Having thus described my invention, I claim as new, and desire to secure by Letters Patent,

1. In a fruit cutter a blade having alternately disposed transverse corrugations, said corrugations being provided with notches at one end forming inclined cutting edges.

2. In a fruit cutter a blade formed with alternately disposed transverse corrugations, each corrugation terminating in a scalloped cutting edge, said blade being further formed with teeth successively connecting said cutting edges.

AUGUSTUS J. BRUNSON.

Witnesses:
FLORENCE ROSAMOND HILL,
ALEXANDER RUSSELL BOND.